(12) United States Patent
Ju et al.

(10) Patent No.: US 11,386,652 B2
(45) Date of Patent: Jul. 12, 2022

(54) TAGGING OBJECTS IN AUGMENTED REALITY TO TRACK OBJECT DATA

(71) Applicant: PayPal, Inc., San Jose, CA (US)

(72) Inventors: Yona Ju, San Jose, CA (US); Fun-Chen Jou, San Francisco, CA (US)

(73) Assignee: PAYPAL, INC., San Jose, CA (US)

( * ) Notice: Subject to any disclaimer, the term of this patent is extended or adjusted under 35 U.S.C. 154(b) by 75 days.

(21) Appl. No.: 16/727,744

(22) Filed: Dec. 26, 2019

(65) Prior Publication Data
US 2021/0201029 A1    Jul. 1, 2021

(51) Int. Cl.
G06V 20/20       (2022.01)
G06K 9/62        (2022.01)
G06T 11/00       (2006.01)
G06Q 30/06       (2012.01)

(52) U.S. Cl.
CPC .......... *G06V 20/20* (2022.01); *G06K 9/6277* (2013.01); *G06Q 30/0635* (2013.01); *G06Q 30/0643* (2013.01); *G06T 11/00* (2013.01)

(58) Field of Classification Search
None
See application file for complete search history.

(56) References Cited

U.S. PATENT DOCUMENTS

| | | | |
|---|---|---|---|
| 9,921,641 B1* | 3/2018 | Worley, III | ........... G06F 3/0304 |
| 2008/0268876 A1 | 10/2008 | Gelfand | |
| 2013/0297460 A1* | 11/2013 | Spivack | ............. G06Q 30/0641 705/27.2 |
| 2016/0283519 A1* | 9/2016 | Glasgow | ............... G06F 3/0485 |
| 2018/0108079 A1 | 4/2018 | Traub | |
| 2018/0181997 A1* | 6/2018 | Sanjeevaiah Krishnaiah ............. H04L 67/22 |
| 2018/0197221 A1* | 7/2018 | Grossman | ............. G06F 3/0482 |
| 2019/0122443 A1 | 4/2019 | Stöcker | |
| 2019/0206130 A1* | 7/2019 | Ericson | .................... G06K 9/18 |
| 2019/0373412 A1* | 12/2019 | Subramanian | ........ H04W 4/024 |
| 2020/0409511 A1* | 12/2020 | Cowburn | ............ G06F 3/04842 |

OTHER PUBLICATIONS

United States Patent and Trademark Office, International Search Report and Written Opinion for PCT/US2020/065111, dated Mar. 19, 2021, 8 pages.

* cited by examiner

*Primary Examiner* — Michelle Chin
(74) *Attorney, Agent, or Firm* — Haynes and Boone, LLP

(57) ABSTRACT

There are provided systems and methods for tagging objects in augmented reality to track object data. A user may capture visual data utilizing a device at a location, where the visual data includes one or more objects that the user may wish to associate with a purchase or sell offer. A device may perform object recognition to identify the object and an identifying characteristic of the object. A service provider may then receive offer details and may generate a graphical object or other virtual data that can be displayed with the object in an augmented reality experience. Later, when the object is identified in another augmented reality experience on a different device, the virtual graphic may be displayed, which may show the offer for the object. Further, the augmented reality may be used to process a transaction for the object and track the object.

20 Claims, 6 Drawing Sheets

US 11,386,652 B2

TAGGING OBJECTS IN AUGMENTED REALITY TO TRACK OBJECT DATA

TECHNICAL FIELD

The present application generally relates to augmented reality, and more specifically to an augmented reality that allows users to tag objects with virtual tags that may allow owners of the objects to track the object's data.

BACKGROUND

Various types of service providers may provide augmented reality for certain uses, including overlaying graphical objects over real-world images so that additional data may be seen with real-world images. This augmented reality may allow users to play games, interact with other users in a virtual environment, and perform other services. Additionally, these service providers may provide other services to users, including electronic transaction processing to users. However, objects in an augmented reality may be difficult to track where the objects may move, such as vehicles, personal items, or users. Moreover, the other services of the service provider may not allow for tracking of data in a manner that can be easily displayed with the objects. Thus, users may be unaware of particular information associated with an object, such as items or property that user may own.

Figure 1:
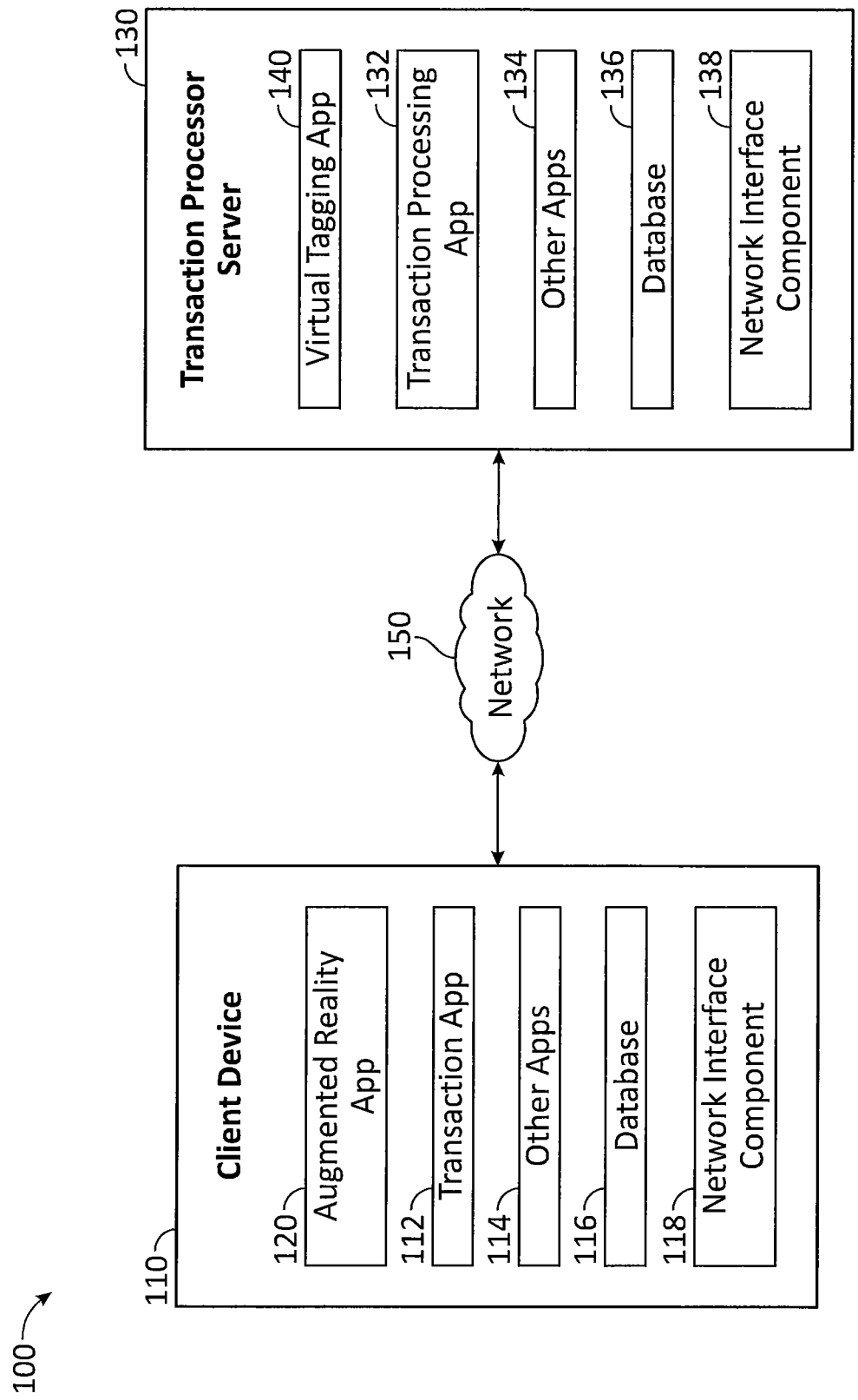
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for tagging objects in augmented reality to track object data. Systems suitable for practicing methods of the present disclosure are also provided.

According to various embodiments, a user may utilize a communication device while traveling through a real-world environment to capture images, including video or three-dimensional scans of real-world objects and environments. The user may view an item, such as a real-world object that the user would like to purchase, which may correspond to property (e.g., a home) or moveable property and items, including vehicles, personal property, and the like. The user may capture the real-world object through an augmented reality experience, scene, or environment that records real-world images of a real-world environment, displays those images, and overlays graphics onto the images so that virtual graphics, graphics, icons, or other information may be displayed with, over, next to, and/or associated with the real-world objects. For example, an augmented reality experience may be universal over multiple device so as to provide, through one or more devices, captured real-world images, video, or scans with various visual indicators, graphical objects, and other virtual data. This creates an experience that includes both real and virtual data. Thereby, a device may generate a digital scene that includes a mix or real and virtual graphics. When viewing the real object, the user may decide to make on offer on purchase of the object. In other embodiments, the user may be a seller and may add a sale offer to the object. The user may input data for the offer and the offer may be attached to the object. For example, the user may specify, or a service provider may determine, one or more identifying characteristics of the object from the visual data captured in the augmented reality experience. The characteristic may correspond to a geo-location, identifying mark, identifier, or other information about the object. These identifying characteristics may be used to generate an object "fingerprint" that correspond to the identifying characteristics that collectively may be used to identify the object in captured visual data. The service provider may generate a virtual graphic or graphic for the augmented reality. This may be stored with the identifying characteristic so that when the object is again identified in the augmented reality experience by the user's device or another user's device, the graphic may then be displayed. For example, the graphic may include an overlay the graphic on or with the images of the real-world object so that the offer can be seen with the real-world object by the user or a different user's device including the device of the owner of the object. The augmented reality may further be used to electronically process a transaction between the buyer and seller. Thus, a service provider may provide output of a dynamically generated and displayed augmented reality, which allows specific data to be tracked with an object so that multiple disparate users may see the data.

In order to buy or sell items through virtual graphics in an augmented reality, a user may create an account with a service provider. The user may be required to provide personal or other identification information to establish the account, such as a name, address, and/or other information. The user may also be required to provide financial information, including payment cards (e.g., credit/debit cards), bank account information, gift cards, and/or benefits/incentives, which may be utilized to provide payments or otherwise engage in processing of another transaction. In order to create an account, the user may be required to select an account name and/or provide authentication credentials, such as a password, personal identification number (PIN), security questions, and/or other authentication information. The service provider may utilize such information to create the account for the user and provide the user with a digital wallet to the user that allows for electronic transaction processing. The digital wallet may store the user's financial instruments of the user and allow the user to process transactions through the digital wallet. In this regard, the service provider may provide a digital token, such as a data package, that represents the digital wallet and may approve the digital wallet for processing of a transaction with the service provider to a device that receives the token. Thus, the token may include data identifying the digital wallet (e.g., a token), as well as authentication information including an identifier for user of the digital wallet, which may be encrypted. The account may also include a device identifier or other contact information for the user so that the user may be contacted to complete a transaction for an item tagged in an augmented reality.

Once an account is created, the account may be accessed through a web browser from a website of the service provider and/or a dedicated application of the service provider, such as a mobile smart phone application. The application (or website) may be associated with a payment provider, such as PayPal® or other online payment provider service, which may provide payment services. The application may execute on the computing device for a user and may provide various functionalities and processes to the user. For example, a user may utilize the account through the website or a device application that allows for tagging of real objects in an augmented reality with additional data for an offer for sale of the item. In this regard, the user may utilize a communication device to capture visual content or other data including a representation of one or more items. Image, video, or other audiovisual data at a real-world location may capture a representation of an item as an object within a real-world environment. The user's communication device may include a camera, microphone, or other input device that may be used to capture visual data of a real-world scene that includes the item or other object, such as an image or video of the object as well as other nearby objects in the real-world environment. In order to identify object within the environment, various visual data captured by the camera of the device may be used. Within an image or video, the representations, locations, and visual data of object may be used to determine identifying characteristics, marks, or other data of the object that allows for tracking and/or identification of the object to other devices.

For example, the video or other image data may be required to be processed to determine and/or recognize the object. Visual data (e.g., images and/or videos, including three-dimensional scans) capturing one or more objects may be processed to recognize the object within the image by determining which object is selected in the visual data and a characteristic that may be used to recognize the object in the future to other devices and servers. One or more image processing techniques and recognition algorithms may be utilized to determine an object within visual data, including object recognition. The object of interest to a user may be designated with physical cues, such as pointing to an object or location within the environment. The physical cues may further be utilized to perform additional data input including creating an offer for an object of interest (e.g., by circling the object or drawing a certain symbol), as well as increasing an offer previously created by the user or another user (e.g., an up gesture, such as a "thumbs up" sign). This may allow the user to utilize gestures to perform multiple actions within the augmented reality application and environment.

Other data may be used to identify the environment and/or items, for example, audio data, including verbal statements, may identify the item and/or the environment or other data necessary to identify the item. An image processing and/or object recognition process may be used to identify the object through comparison of the captured data to other images/video and/or analysis of the data using known item features, landmarks, or other signifying data points. For example, object feature data may be extracted, which may include distances between signifying points or points of interest in the visual data. Depth or width of these signifying points or image landmarks may be extracted, as well as a size relative to other features in the visual data. Other data points may also be determined in the visual data, which may include other features of note. For example, particular objects may have an identifying characteristic or mark, such as a scratch or license plate on a vehicle, a color, numbers or letters on the object, and other information. This may include wording on the object, a logo or tag, a barcode or QR code, a location relative to other objects, or other data including a color of the item, environmental information in the visual data, contrast and/or lighting in the visual data, and other context related data for the visual data. Thus, computer algorithms, image processing techniques, and/or machine learning processes may be utilized to determine and identify an item in visual data captured by the first user. Thus, the identifying characteristic may include further data than just an object shape or scan, which may be used to more specifically determine the particular object.

Additionally, the visual data may be accompanied by metadata that may be used by the service provider to identify and track the particular object. For example, the communication device capturing visual data at a location may determine a location of the user, device, and/or object through a GPS module or locator associated with the device. This may be appended to the visual data as metadata, which may be transmitted to the service provider with the visual data. In some embodiments, the metadata may include a timestamp of the visual data that is captured with the visual data. The timestamp may be used to track the object based on probability analysis that the object has moved a certain distance from an initial geo-location where the object is tagged. For example, a bicycle or car may only be capable for traveling a certain distance from its location. Thus, if a similar object is later captured but too far for the original object to travel, then the similar object is unlikely to be the original object. The probability may be based on a machine learning model generated from one or more past travels of the object or similar object and types. Additionally, the machine learning model may utilize known locations of travel or identification of the object to determine whether the objects in different augmented reality visual data at different times are the same object. For example, a first user may capture the object at a first location and make an offer. Later a second user may also capture the object at a second location, where the object is determined to be the same as the object at the first location. These identifications, with additional identifications, may be used to build a model of known locations of the object for higher probabilistic determination of the object when located at known locations. Further, a geofence of probable locations of the object may be generated based on the detected locations for use with the machine learning model.

The model may also be weighted based on available data, such as traffic, road maps, demographics, user information (e.g., employment, past travel routes, etc.) and other information. The machine learning model may also utilize the extract feature data, such as the identifying characteristics of the captured object, to determine if the object is the same (or similar) to the original object. Thus, the location data may be utilized with the extracted feature data by a machine learning model with additional identifying characteristics when identifying objects in visual data. Thus, information in the visual data that may be used to determine a corresponding object may include text within the image, color, contrast, lighting, geographic location, time of capture of the visual data, audio within the visual data, or other data within the visual data or associated with the visual data, such as metadata. In this regard, different items may be sold in different flavors, types, brands, or other versions in specific locations, which may be detected based on color, description on packaging, geographic location, or other information. The feature data, location(s), timestamp(s), and other data may collectively be utilized to generate an object fingerprint that is then utilized to identify the object when captured in the augmented reality experience through the probabilistic machine learning model.

Once the object in the captured data is determined, the service provider may receive a request to attach an offer to the object, such as an offer to purchase the product or a sale offer to sell the product (e.g., by a buyer or seller, respectively, of the object). For example, the user may utilize their device to select the object within an augmented reality experience, where the object is then identified and the user may provide additional input (and/or the service provider may request the input) for the offer. The additional input may correspond to an amount for the offer, as well as a description of the offer, object, or location. Additionally, the input may include a contact identifier, such as a phone number, messenger name, or other data that allows the owner of the object to respond to the offer or allows a buyer of the object to message the seller and make an offer. The input and also include a selection of a particular virtual graphic, such as a box, speech bubble, highlighting, or other graphical object that can be overlaid on an image of the real object in further images of real-world environment of the real object so that other users can view the offer.

Using this input, the service provider may then generate an item/object-specific visual indicator, change, or modification of the real object for use with the augmented reality. The virtual graphic for the augmented reality may correspond to a visual change of the display or output of the in the augmented reality. The visual indicator or modification of the object may correspond to a graphic object overlaid onto the object and may adjust output parameters for the item, such as pixels, resolution, size, brightness settings, color gradient, etc. For example, the indicator or modification may be done by one or more of highlighting, adjusting a color gradient, adjusting a brightness of the item, or adding some graphic to the object when the object is viewed in an augmented reality experience. The indicator may also correspond to text overlaid onto the object or placed nearby the object. Thus, a visual indicator may be displayed as a graphic overlaid onto the representation of the item in the displayed environment, such as a highlight of the item, a box around the item, a pointer to the item, or other information. A modification may also be displayed by modifying display values for the representation of the item in the output data. The visual indicator or modification may also be selectable and may be interacted with through one or more input device of the communication device, for example, to pull up object or offer information.

Thereafter, an augmented reality experience having the environment with one or more computer generated graphics or other data may be output to other users, including the owner of the item or other potential buyers of the item that utilize their computing device. The user may interact with the augmented reality to view particular data for the offer, as well as respond to the offer. In order to identify the object to other devices, for example, where the object may move and/or where a second user may then visit the location of the object, the identifying characteristic(s) of the object may be used with an object recognition system. For example, an identifying mark (e.g., physical marking on the object) may be used to identify the object. In addition, a geo-location may be used if the object is stationary or has been since the object was last imaged in the augmented reality experience. Where the object may be mobile, a timestamp of when the object was first or last imaged in the augmented reality experience and a current time of imaging the object may be used to determine whether the currently imaged object is likely to be the same as the previously imaged object. For example, a probabilistic model may be utilized with a machine learning engine to determine if the mobile object is likely to still be within the same area or radius. The probabilistic model may also be based on other available data, such as weather, traffic, and the like. Using the model, the service provider may predict whether it is possible for the object to have traveled at the current geo-location of the object. For example, if the object is originally captured in the augmented reality at 4:00 PM at a first geo-location and a similar object captured at 4:15 PM but 60 miles from the first geo-location at a second geo-location, the service provider may utilize the probabilistic model to determine there is a low likelihood the objects are the same. Thus, a threshold percentage or level may be required to be exceeded before determining that the objects potentially match.

If the object is identified and matched, the virtual graphic or graphic for the offer may be displayed in the augmented reality experience on the second device. In various embodiments, a device of the second user may correspond to a wearable computing device, which may present the indicators or other data in the augmented reality. For example, wearable eyeglasses with associated computing devices may present the augmented reality when the second user is viewing or in an environment corresponding to the item. In other embodiments, the output data may be displayed when the second user is viewing the item in the augmented reality through an application executing on a device, which may be overlaid in the website or application interface presented through the device interface. The second user may then interact with the offer, such as by viewing information and terms for the offer. The offer may also allow the second user to contact the first user to accept the offer, provide a counter offer, or otherwise perform a sale/purchase of the object.

In some embodiments, the object may correspond to an object that has not been put up for sale by the owner of the object. In such embodiments, the owner may prefer to not sell the item, and may select "Don't want to sell," or similar options within the augmented reality experience. This may alert the potential buyer that the owner does not want to sell the object using the contact identifier. Further, this action by the owner may further prevent additional offers for the object by other users, including adjusting the augmented reality experience to prevent offers (e.g., greying out the item or blurring, adding a graphic, etc.). In some embodiments, the augmented reality graphic may be displayed to the same user or other users with additional information provided by the seller, the owner, or other users. For example, the seller and/or owner may add a reserve price and/or auction date or time that is added to the augmented reality graphic. This information may be displayable to the potential buyer and/or other users when viewing the augmented reality graphic. In some embodiments, the service provider providing the augmented reality experience may receive correspondence from the buyer(s) and/or seller/owner. In such embodiments, the correspondence may be analyzed to suggest or add a reserve price, sale price, or auction time period for the object.

Additionally, the offer and other offers for the object or similar objects may be stored to a distributed ledger on multiple different devices so that a blockchain of records for offers for the object may be generated. This allows the offers (including the virtual graphic for the augmented reality experience) for the same or similar objects to be retrievable by different devices and also stored in distributed records that allow for additional trust as the distributed records are more difficult to tamper with without being revised based on other records in the blockchain ledger. Electronic transaction processing may then be performed for the object between the users using an online transaction processor and the data for the virtual graphic within the augmented reality. The accounts of the users may be used to send and receive funds. In this regard, an account may further be linked to the offer, virtual graphic, and/or real-world object so that buying and selling of the object may occur through the augmented reality using the transaction processor.

In this regard, an augmented reality view or experience may be generated that provides object data to a user that would normally not be visible to a user when viewing real-world or online data. Thus, a communication device may assist in data determination and output of visual data through performing object recognition and image processing that assist in presenting the augmented reality. Additionally, the augmented reality may be used to track objects as the objects move through a real-world environment such that tagged data within the augmented reality experience may attach to the object and allow other users to view virtual graphics for the data. This allows for automated generation of the augmented reality on other devices that provides for tracking an displaying data virtually and without users being required to search for and request data. Further, by using a distributed ledger for the virtual graphics and other data, the data may be more trustworthy as tampering with the data may be much more difficult.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, standalone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a client device 110 and a transaction processor server 130 in communication over a network 150. A user (not shown) may utilize client device 110 to utilize the various features available for client device 110, which may include processes and/or applications associated with transaction processor server 130 to view an augmented reality experience provided by one or more augmented reality applications and tag real-world objects within a real-world environment with virtual data that may track with the object and be presented to other users. The user may utilize client device 110 to capture real-world visual data. The data may then be marked by users, including by setting sale or purchase offers, which may be used to generate a virtual graphic, such as a visual indicator, for the augmented reality experience. The virtual graphic or other virtual visual indicator may then be stored with one or more identifying characteristics of the object so that other devices capturing the augmented reality may then view the virtual graphic with the real-world object through the augmented reality experience.

Client device 110 and transaction processor server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Client device 110 may be implemented as a communication device that may utilize appropriate hardware and software configured for wired and/or wireless communication with transaction processor server 130. For example, in one embodiment, client device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Client device 110 of FIG. 1 contains an augmented reality application 120, transaction application 112, other applications 114, a database 116, and a network interface component 118. Augmented reality application 120, transaction application 112, and other applications 114 may correspond to executable processes, procedures, and/or applications with associated hardware. In other embodiments, client device 110 may include additional or different modules having specialized hardware and/or software as required.

Augmented reality application 120 may correspond to one or more processes to execute software modules and associated devices of client device 110 to receive or record visual data and process the visual data to determine an identification of an object in an environment and associated item data, as well as generate, alter, or interact with a visual indicator or other visual modification of the object in the environment through an augmented reality output. In this regard, augmented reality application 120 may correspond to specialized hardware and/or software utilized by a user of client device 110 that first receives, captures, and/or records video data, including audiovisual data that includes audio data that may also be processed to determine item identifications in the environment. Augmented reality application 120 may utilize a camera or other optical/visual data capturing device of client device 110. For example, the visual data capture device may correspond to at least on optical or visual capture device of client device 110 enabling a user associated with client device 110 to capture or record images, including still and/or video images. Input devices may correspond to a digital camera on client device 110 (e.g., incorporated in client device 110 such as a mobile phone's digital camera in a traditional camera orientation and/or a forward facing camera orientation that captures one or more users as they use and view a display screen of client device 110) or associated with client device 110 (e.g., connected to client device 110 but incorporated within a body or structure of client device 110), or may more generally correspond to any device capable of capturing or recording an image, video, or other digital media data.

As a digital camera, input devices may include a sensor array disposed on a semiconductor substrate having a plurality of photosensitive elements configured to detect incoming light. In other embodiments, other types of electromagnetic radiation sensors may be used, including infrared sensitive sensors/elements and the like. A camera of input devices may include various features, such as zoom, flash, focus correction, shutter speed controls, or other various features usable to capture one or more images or videos of the user and/or other users or objects. Input devices may include other media capture components, including a microphone to capture audio data. Input devices may further display a preview and/or captured image to the user through another device of client device 110, such as a viewfinder, screen (e.g., mobile phone touch screen, tablet touch screen, and/or personal computer monitor), or other display. Input devices may interface with one or more applications of client device 110 to capture visual media data, such as images/videos, and may output an augmented reality of the captured visual media data to provide budgetary recommendations and alterations of item appearances in the visual data based on the budgetary recommendations.

The captured visual data may include real-world data, which may include a visual representation of one or more real-world objects. Object identification may be determined through received the visual data for one or more objects in an environment in image or video data that provides contextual data allowing for identification of the object. For example, augmented reality application 120 may allow a user to select a portion of an image of video to highlight an object or select the object for interacting with in an augmented reality experience including the visual data of the real-world and virtual graphics or visual indicators added by augmented reality application and/or transaction processor server 130. Once the object has been selected for interaction, augmented reality application 120 provide the data to transaction processor server 130 for determination of an identifying characteristic of the object, which may be used to track the object as the object moves and/or as other devices capture the object through another augmented reality application, scene, and/or experience. However, augmented reality application 120 may also provide the determination of the characteristic, which may include allowing a user to select the characteristic and/or provide input of a mark on the object. In some embodiments, the identifying characteristic may correspond to a geo-location, a time of capture of the visual data and object, and/or a specific mark or identification parameter of the object.

Additionally, with the visual data, the user of client device 110 may provide an offer for the object, such as a sale offer of an object that a user owns or a purchase offer for the object by a buyer. Transaction processor server 130 may then generate a virtual graphic or other visual indicator that may be associated with the object based on the identifying characteristic so that other users may view the offer for the object. For example, the virtual graphic may correspond to a graphical image, object, icon, or other displayable information that may be overlaid over real-world images or video in the augmented reality experience provided by augmented reality application 120. This may also include a graphical overlay and/or a modification of image/video parameters for the item. The visual indicator or other virtual graphic may correspond to highlighting, adding text, or placing another graphic on or near the item's visual representation, and/or may include adjusting pixels, resolution, size, brightness settings, color gradient, or other image/video parameter. For example, the indicator may be done by one or more of highlighting the item, adjusting a color gradient of the item, or adjusting a brightness of the item in the image, or may include overlaying other images or graphics onto the item.

Augmented reality application 120 may also be used to view other objects and previously established virtual graphics and/or indicators through an augmented reality experience. For example, augmented reality application 120 may capture a different scene having real-world objects with previously attached offers from other users. Using the identifying characteristic, augmented reality application 120 and/or transaction processor server 130 may determine the offers for the real-world objects using the corresponding identifying characteristics, as well as probabilistic models that the objects are the same, to display the virtual graphics or indicators within the augmented reality experience. Thus, the captured audio and/or visual data by augmented reality application 120 may be used to determine an augmented reality experience for the real-world scene, where the visual indicators are displayed as graphics by augmented reality application 120 overlaid or modifying the visual output of the displayed environment. In this regard, augmented reality application 120 may further allow a user to process transactions using transaction application 112.

Transaction application 112 may correspond to one or more processes to execute software modules and associated devices of client device 110 to provide electronic transaction processing for objects having sale or purchase offers provided through visual indicators and other objects in an augmented reality experience provided by augmented reality application 120. In this regard, augmented reality application 120 may correspond to specialized hardware and/or software utilized by a user of client device 110 that provides transaction processing services or may detect a transaction processing event, for example, through one or more processes that provide an interface to permit the user to enter input and other data for transaction information, for example, through an input device (e.g., touch screen with a graphical user interface, keypad/keyboard, mouse, etc.) and/or through a data capture device (e.g., camera, other optical device, etc.). Such information may be used to alter or process data from an augmented reality scene provided by augmented reality application 120 that has real-world visual data, for example, by adding account data and/or a contact identifier for an account, user or client device 110 and/or by processing a transaction for an offer.

During virtual graphic generation and/or transaction processing, transaction application 112 may be utilized to select payment instrument(s) for use with the object or transaction. As discussed herein, transaction application 112 may utilize user financial information, such as credit card data, bank account data, or other funding source data, as a payment instrument when providing payment information, including an account with transaction processor server 130. For example, transaction application 112 may utilize a digital wallet associated with an account with a payment provider, such as transaction processor server 130, as the payment instrument, for example, through accessing a digital wallet or account of a user with transaction processor server 130 through entry of authentication credentials and/or by providing a data token that allows for processing using the account. Transaction application 112 may also be used to receive a receipt or other information based on transaction processing. This data may be shared with transaction processor server 130 for use in tracking historical prices of an object through a blockchain.

In some embodiments, one or more of the processes of augmented reality application 120 and transaction application 112 may be provided within the same application so as to provide their services through a single application.

In various embodiments, client device 110 includes other applications 114 as may be desired in particular embodiments to provide features to client device 110. For example, other applications 114 may include security applications for implementing client-side security features, programmatic client applications for interfacing with appropriate application programming interfaces (APIs) over network 150, or other types of applications. Other applications 114 may also include email, texting, voice and IM applications that allow a user to send and receive emails, calls, texts, and other notifications through network 150. In various embodiments, other applications 114 may include financial applications, such as banking applications. Other applications 114 may also include other location detection applications, which may be used to determine a location for the user, such as a mapping, compass, and/or GPS application, which can include a specialized GPS receiver that obtains location information for client device 110 and provide the location for a particular object, scene, or other data associated with an augmented reality experience. Other applications may include social networking applications, media viewing, and/or merchant applications. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use devices of client device 110, such as display devices capable of displaying information to users and other output devices, including speakers, which may display an augmented reality to a user.

Client device 110 may further include database 116 stored in a transitory and/or non-transitory memory of client device 110, which may store various applications and data and be utilized during execution of various modules of client device 110. Thus, database 116 may include, for example, identifiers such as operating system registry entries, cookies associated with augmented reality application 120 and/or transaction application 112, identifiers associated with hardware of client device 110, or other appropriate identifiers, such as identifiers used for payment/user/device authentication or identification, which may be communicated as identifying client device 110 to transaction processor server 130. In various embodiments, database 116 may store real-world images and/or virtual graphics or indicators for an augmented reality, as well as offer data for the virtual data of the augmented reality experience.

Client device 110 includes at least one network interface component 118 adapted to communicate with transaction processor server 130 and/or another device or server for electronic transaction processing. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices. In some embodiments, communication device 110 may also communicate directly with nearby devices (e.g., merchant device 130) using short range communications, such as Bluetooth Low Energy, LTE Direct, WiFi, radio frequency, infrared, Bluetooth, and near field communications.

Transaction processor server 130 may be maintained, for example, by an online service provider, which may provide transaction processing and payment services, as well as augmented reality services for virtually tagging objects and associating those objects with offers for purchase or sale. In this regard, transaction processor server 130 includes one or more processing applications which may be configured to interact with client device 110, and/or another device/server to facilitate an augmented reality experience for object purchasing. In one example, transaction processor server 130 may be provided by PAYPAL®, Inc. of San Jose, Calif., USA. However, in other embodiments, transaction processor server 130 may be maintained by or include another type of service provider, which may provide connection services to a plurality of users.

Transaction processor server 130 of FIG. 1 includes a virtual tagging application 140, a transaction processing application 132, other applications 134, a database 136, and a network interface component 138. Virtual tagging application 140, a transaction processing application 132, and other applications 134 may correspond to executable processes, procedures, and/or applications with associated hardware. In other embodiments, transaction processor server 130 may include additional or different modules having specialized hardware and/or software as required.

Virtual tagging application 140 may correspond to one or more processes to execute software modules and associated specialized hardware of transaction processor server 130 to provide tagging of real-world objects with virtual data, including virtual graphics, text, and/or visual indicators, in an augmented reality experience that may be provided through augmented reality application 120. In this regard, virtual tagging application 140 may correspond to specialized hardware and/or software to first receive visual data of a real-world environment, for example, as client device 110 captures a scene through a camera and augmented reality application 120. Using the visual data, virtual tagging application 140 may identifying objects that a user has selected, and particular identifying characteristics with the object. In some embodiments, this may include detecting a geo-location of the object, determining a time of tagging and/or capture of the object, and/or determining a specific visual mark or identifying feature of the object that can be detected in other images or video. The identifying characteristic may be selected by client device 110 and/or may further include data for an offer for the object, such as a purchase or sale. The offer may include selections of data or other options for generation of a virtual graphic or visual indicator for the offer to be displayed with the object in the augmented reality experience. After generating the virtual graphic, virtual tagging application 140 may then store the offer, virtual graphic, and other data with the identifying characteristic so that the virtual graphic and offer details may be displayed in the augmented reality experience to other devices when capturing the object by those other devices.

Virtual tagging application 140 may later receive additional visual data that captures the object. For example, client device 110 or a similar device may execute augmented reality application 120 (or a corresponding application) to capture visual data of a real-world scene. Virtual tagging application 140 may process the visual data to determine whether the visual data includes one or more identifying characteristics that match the previously stored identifying characteristic. For example, a geo-location for the newly captured visual data may be compared to past geo-locations of objects. In this regard, the geo-location may also be processed using a probabilistic model whereby virtual tagging application 140 determines a probability that the object is still located within an area or that the object may have traveled the distance between the geo-locations. If a match occurs or the model indicates a sufficiently high probability of the object matching (e.g., over a threshold), then virtual tagging application 140 may display the virtual graphic or visual indicator having the offer details through the augmented reality experience capturing the new visual data of the real-world scene. This may include overlaying graphics, adjusting visual parameters of the scene, or otherwise presented augmented reality details with the real-world images of the object. If the user accepts the offer for the object, transaction processing application 132 may be used to process a transaction for the object.

Transaction processing application 132 may correspond to one or more processes to execute modules and associated specialized hardware of transaction processor server 130 to process a transaction for one or more objects have an associated offer tagged to the object in an augmented reality experience. In this regard, transaction processing application 132 may correspond to specialized hardware and/or software used by a user associated with client device 110 to establish a payment account with transaction processing application 132 by providing personal and/or financial information to transaction processor server 130 and selecting authentication credentials. In various embodiments, the financial information may include payment instrument information, such as account/card numbers and information. The account may be used to send and receive payments. The payment account may be accessed and/or used through a browser application and/or dedicated payment application executed by client device 110, such as transaction application 112.

In some embodiments, client device 110 may generate transaction data for a transaction for a real-world object based on a virtual graphic or indicator for an offer that is associated with the real-world object in an augmented reality experience, such as one provided through augmented reality application 120. Thus, transaction processing application 132 may interact with client device 110 to generate and process the transaction data, which may include interacting with another device or account to process the transaction for the object. Transaction processing application 132 may receive a payment request from client device 110 for the transaction data with the user's account, which may include identifiers, tokens, or other data used for transaction processing. Transaction processing application 132 may process a payment and may provide a transaction history to client device 110 and/or another user's device or account for transaction authorization, approval, or denial of the transaction.

In various embodiments, transaction processor server 130 includes other applications 134 as may be desired in particular embodiments to provide features to transaction processor server 130. For example, other applications 134 may include security applications for implementing server-side security features, programmatic client applications for interfacing with appropriate application programming interfaces (APIs) over network 150, or other types of applications. Other applications 134 may contain software programs, executable by a processor, including a graphical user interface (GUI), configured to provide an interface to the user when accessing transaction processor server 130, where the user or other users may interact with the GUI to more easily view and communicate information. In various embodiments, other applications 134 may include connection and/or communication applications, which may be utilized to communicate information to over network 150.

Additionally, transaction processor server 130 includes database 136. The user and/or the merchant may establish one or more digital wallets and/or accounts with transaction processor server 130. Digital wallets and/or accounts in database 136 may include user information, such as name, address, birthdate, payment instruments/funding sources, additional user financial information, user preferences, and/or other desired user data. Users may link to their respective digital wallets and/or payment accounts through an account, user, merchant, and/or device identifier. Thus, when an identifier is transmitted to transaction processor server 130, e.g., from client device 110, one or more digital wallets and/or payment accounts belonging to the users may be found. Database 136 may store augmented reality data for an augmented reality experience that may be displayed to other devices, including object recognition data, identifying characteristics of objects for object identification and recognition, virtual graphics and/or visual indicators for offers, and offers for objects including offer details, account identifiers, and/or contact identifiers.

In various embodiments, transaction processor server 130 includes at least one network interface component 138 adapted to communicate client device 110 and/or another device or server over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2A:
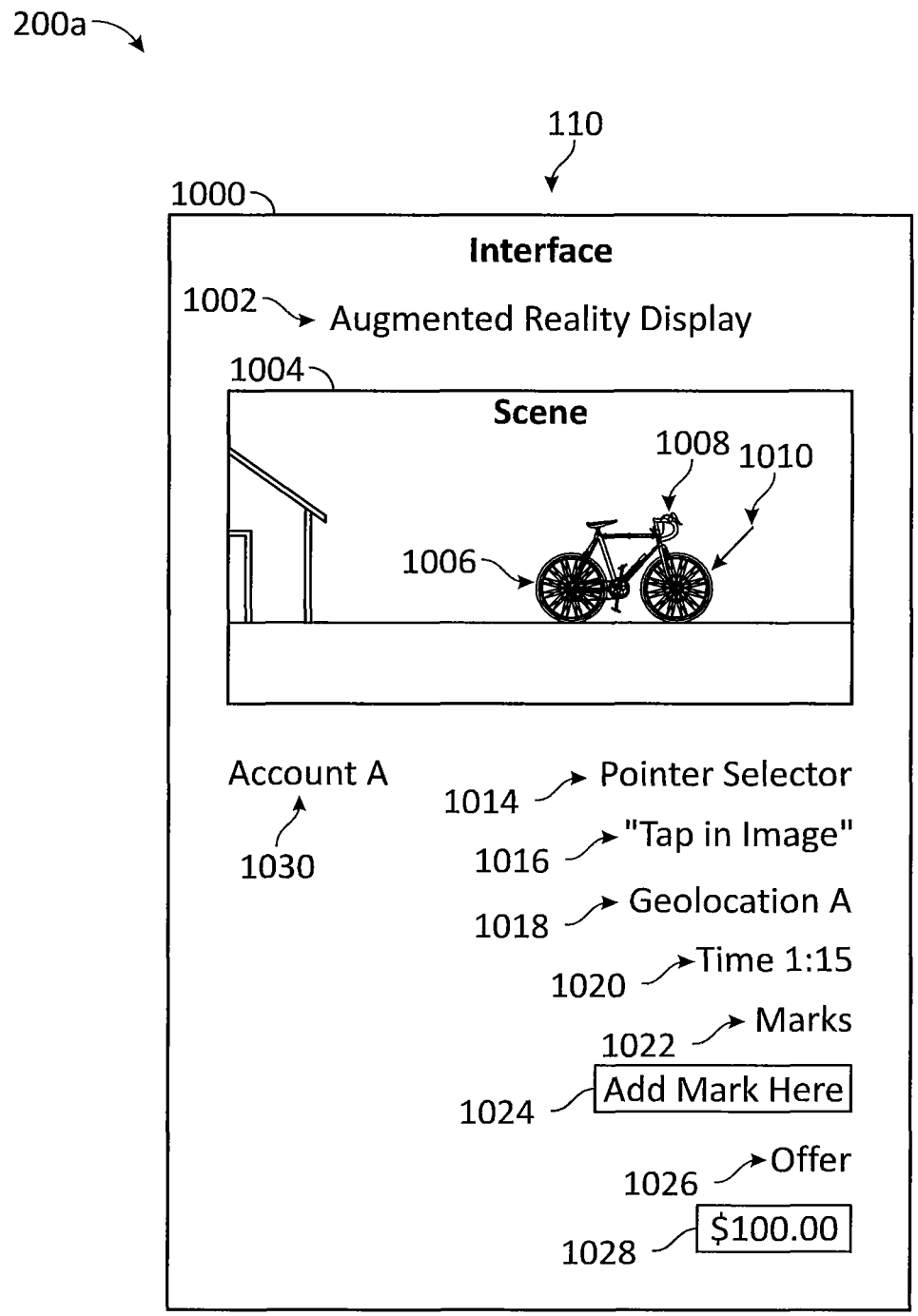
FIG. 2A is an exemplary interface of a communication device displaying an augmented reality where a user is tagging an object with provided data, according to an embodiment.

FIG. 2A is an exemplary interface of a communication device displaying an augmented reality experience where a user is tagging an object with provided data, according to an embodiment. Environment 200a of FIG. 2A includes an interface 1000 of client device 110, for example, corresponding generally to an interface output through the described features, processes, and components of augmented reality application 120 of client device 110 in system 100 of FIG. 1. In this regard, a user utilizing client device 110 may view interface 1000 on client device 110, where interface 1000 corresponds to an interface displaying an augmented reality experience, scene, or other data determined and generated by augmented reality application 120.

In this regard, interface 1000 includes an augmented reality display 1002 that displays augmented reality data for an augmented reality application and experience. For example, a scene 1004 may display real-world data for an environment, as well virtual graphics and visual identifiers overlaid or added to visual data for the real-world environment. For example, a bike 1006 may be shown within scene 1004. Bike 1006 may include an identifying mark 1008, such as a characteristic or feature of bike 1006. This may include rare or uncommon features, such as a sticker, paint, scratch, or other visual appearance that may be unique to bike 1006 or uncommon between bicycles in general. In some embodiments, the feature may be common but may be a feature of interest to the user so that the user would only like similar bikes sharing that feature. Scene also includes a virtual graphic or visual identifier/indicator for a pointer 1010 that may be displayed within scene 1004 based on a request by the user. Pointer 1010 thus corresponds to data not visual in the real-world but added to captured visual data. Additionally, another object, such as a house 1012, may be captured in in scene 1004 and associated bike 1006 so that bike 1006 may be more easily identified in other data captured of bike 1006 (e.g., when bike 1006 is located in proximity to or at house 1012).

Furthermore, interface 1000 may also display further information with, nearby, or associated with augmented reality display 1002. This information may include options to add, alter, or remove data from augmented reality display 1002. For example, a pointer selection 1014 may allow a user to utilize pointer 1010 to select bike 1006 for object identification and generation of a virtual graphic to purchase or sell bike 1006. Thus, a message 1016 informs the user to tap in scene 1004 to generate and move pointer 1010. This allows a user to make selections in scene 1004 and refine the selection of bike 1006 through the use of pointer 1010. Moreover, pointer selector 1014 may also allow changing of pointer 1010 or other selections within scene 1004, such as by drawing a box over an object or circling an object.

Interface 1000 further allows for adding a geolocation tag of geolocation A 1018 and/or viewing the geolocation tag that will be added to augmented reality data for scene 1004. Geolocation A 1018 may be used to add identifying data and characteristics to bike 1006 so that bike 1006 is associated with a geolocation. Similarly, a time 1020 may also be added to bike 1006 and/or the corresponding visual or augmented reality data so that time 1020 may be associated with geolocation A 1018 for bike 1006. This allows determination of whether bike 1006 may move within a probabilistic distance between geolocations. A user using client device 110 may also add marks 1022 to augmented reality data for scene 1004 and bike 1006. This may include selection of identifying mark 1008 or selections of other features for bike 1006 so that other identifying characteristics may be identified. Thus, an option for mark addition 1024 for the augmented reality display may allow for selection of identifying mark 1008 or another feature within scene 1004. Using an offer option 1026, other offer data may be added to field 1028, such as a price of $100.00 that the user is willing to buy or sell bike 1006 for. This information may also be associated with an account A 1030 that may be used to provide or receive payments, add a contact identifier, or other alter an offer.

Figure 2B:
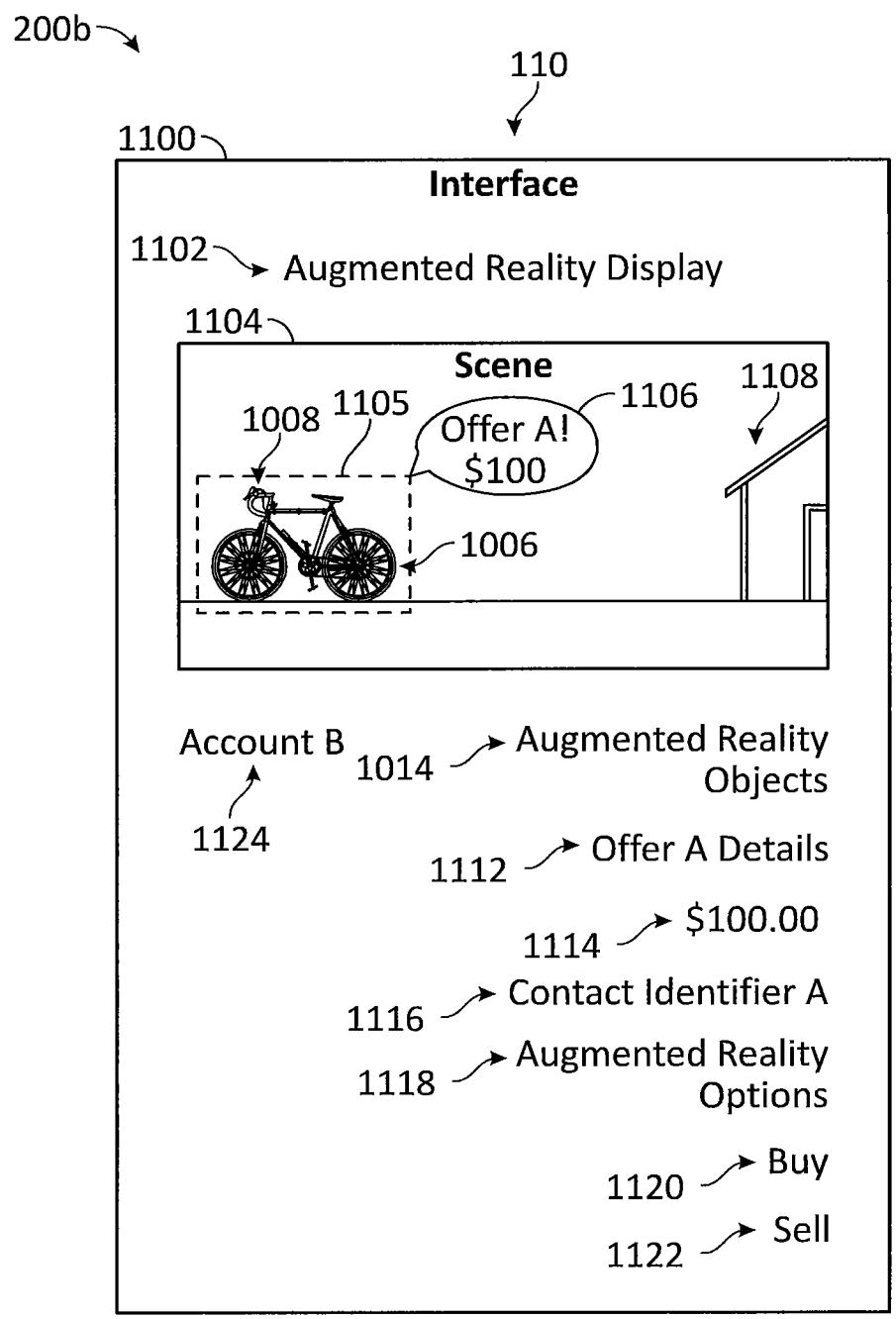
FIG. 2B is an exemplary interface of a communication device displaying an augmented reality having tracked object data, according to an embodiment.

FIG. 2B is an exemplary interface of a communication device displaying an augmented reality having tracked object data, according to an embodiment. Environment 200b of FIG. 2B includes an interface 1100 of client device 110, for example, corresponding generally to an interface output through the described features, processes, and components of augmented reality application 120 of client device 110 in system 100 of FIG. 1. In this regard, a user utilizing client device 110 may view interface 1100 on client device 110, where interface 1100 corresponds to an interface displaying an augmented reality experience, scene, or other data determined and generated by augmented reality application 120.

Interface 1100 displays an augmented reality display 1102 that displays augmented reality data for an augmented reality application and experience. For example, a scene 1104 may display real-world data for an environment, as well virtual graphics and visual identifiers overlaid or added to visual data for the real-world environment. For example, scene 1104 may include objects previously captured in an augmented reality experience by the same or another device. Scene 1104 may therefore display data from the real-world and virtual data captured and generated in environment 200a FIG. 2A. In this regard, scene 1104 includes bike 1006 and identifying mark 1008 previously discussed. These therefore correspond to the same objects and marks in environment 200a. However, in other embodiments where a user does specifically request the same or matching object, bike 1006 may correspond to a similar object within an acceptable range of similarity, which may be set by the user or determined based on a probability of matching model generated using an object recognition engine.

Additionally, scene 1104 for augmented reality display 1102 includes a visual indicator 1105 for bike 1106 that shows bike 1006 is selected, highlighted, or otherwise identified as a point of interest for an offer. Scene 1104 further includes a virtual graphic 1106 that displays the offer associated with bike 1006 and visual indicator 1105. Visual indicator 1105 and virtual graphic 1106 may be displayed in the augmented reality experience for scene 1104 due to recognition of identifying mark 1008 for bike 1006 and/or house 1108. For example, identifying mark 1008 may be used to identify bike 1006 and/or house 1108 may correspond to house 1012 in environment 200a so that bike 1006 is identified with a high degree of probability as matching between different captured virtual data. In further embodiments, a matching geolocation or probabilistic model for geolocation matching may also be used to display visual indicator 1105 and virtual graphic 1106, which may be based on times of captured virtual data and other information.

Furthermore, interface 1100 may also display further information with, nearby, or associated with augmented reality display 1102. For example, augmented reality objects 1110 may be used to display additional information for virtual data that is displayed with objects in an augmented reality experience. Thus, augmented reality objects may correspond to real-world objects, like bike 1006, that includes virtual data for an augmented reality experience. This may include offer A details 1112 that may display additional information for the offer associated with visual indicator 1105 and virtual graphic 1106. For example, price 1114 and contact identifier A 1116 are shown for offer A details 1112. Augmented reality options 1118 allow the user to interact with augmented reality display 1102, such as buy process a buy option 1120 and/or a sell option 1122. This may be done using an account B 1124 with a transaction processor.

Figure 3:
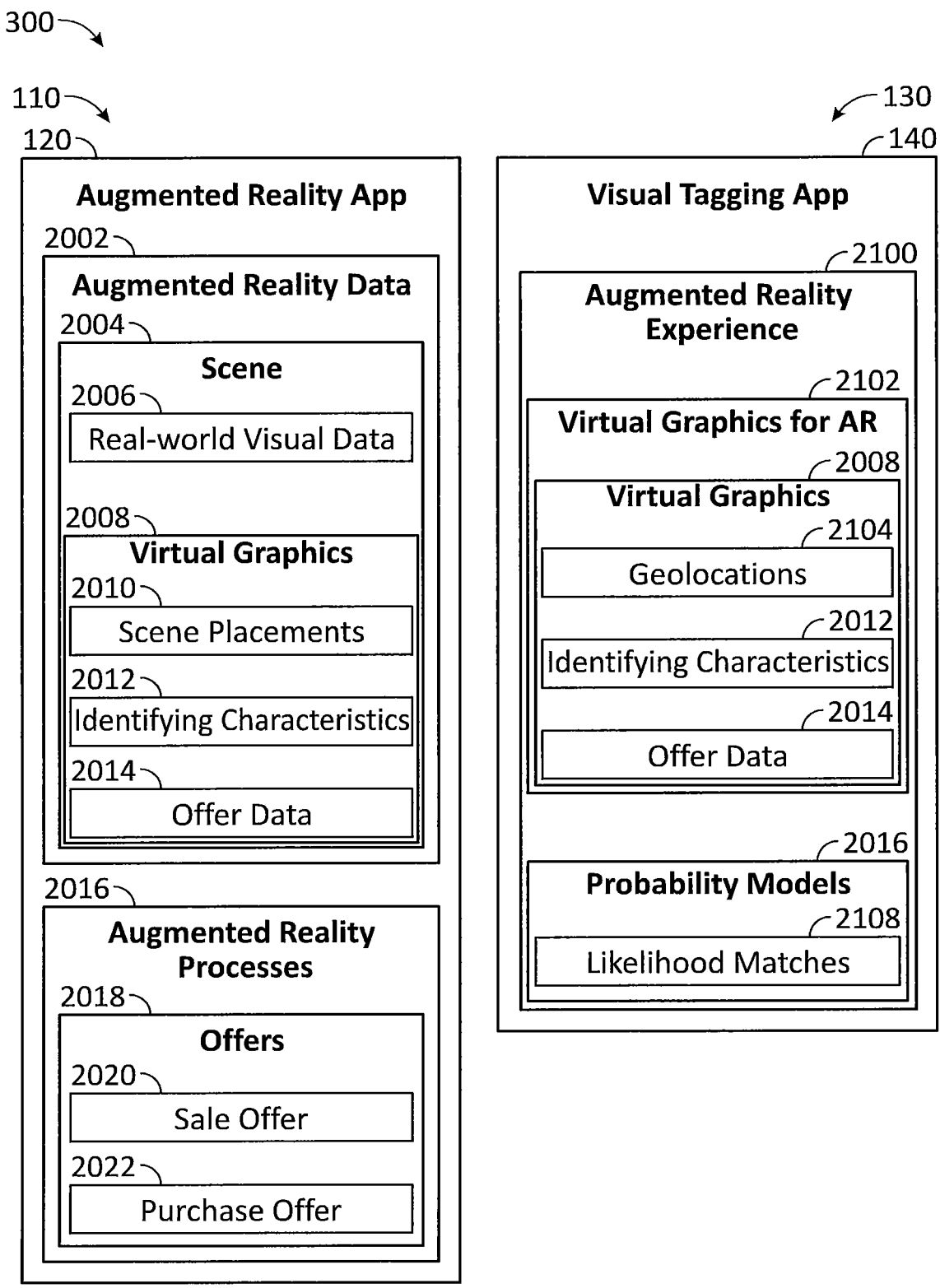
FIG. 3 is an exemplary system environment showing a communication device and a service provider server interacting to provide an augmented reality to track object data, according to an embodiment.

FIG. 3 is an exemplary system environment showing a communication device and a service provider server interacting to provide an augmented reality to track object data, according to an embodiment. Environment 300 of FIG. 3 includes client device 110 and transaction processor server 130 discussed in reference to system 100 of FIG. 1.

Client device 110 includes augmented reality application 120 corresponding generally to the processes and features discussed in reference to augmented reality application 120 in system 100 of FIG. 1. In this regard, augmented reality application 120 includes captured audio, video, and/or audiovisual data, as well as information processed from such data, such as real-world data and virtual data that may be utilized for an augmented reality experience viewed through an application device. For example, augmented reality application 120 may include augmented reality data 2002 for a specific scene viewed through a camera or other optical capture device of client device 110. Augmented reality data 2002 includes a scene 2004 having real-world visual data 2006 captured through that camera or other visual capture component. To create an augmented reality experience, real-world visual data 2006 may be altered with virtual graphics 2008, which may correspond to overlays, visual indicators, or other alterations to a visual output of data through a graphical user interface of a device. Thus, one or more images or videos may be altered using virtual graphics 2008.

Virtual graphics 2008 may also include data utilized to determine a placement of such data within scene 2004. For example, virtual graphics 2008 may include scene placements 2010, which correspond to the necessary data to place one or more virtual graphics within a scene. Identifying characteristics 2012 may be utilized to identify a real-world object within real-world visual data 2006. This may include geolocations, time stamps, identifying visual marks, or other data that allows association with a specific object, or a class of objects, within an augmented reality experience. Further, offer data 2014 may be utilized to present the specific data for virtual graphic 2008 that allows a buy or sell offer to be seen in real-time within that augmented reality experience. Augmented reality application 120 may also include augmented reality processes 2016 to process data viewed with augmented reality data 2002, which may include processing one or more of offers 2018 from the augmented reality experience based on a sale offer 2020 or a purchase offer 2022.

Transaction processor server 130 includes virtual tagging application 140 corresponding generally to the processes and features discussed in reference to virtual tagging application 140 in system 100 of FIG. 1. In this regard, virtual tagging application 140 may be used to provide visual tags, virtual graphics, or other data within an augmented reality experience. For example, visual tagging application 140 may include an augmented reality experience 2102, which may track augmented reality data between multiple devices. Augmented reality experience 2102 may include virtual graphics for augmented realities 2102, which includes those virtual graphics 2008 that may be added to a real-world scene capture by a device. Further, virtual graphics 2008 may be associated with geolocations 2104, identifying characteristics, 2012, and/or offer data 2014 that may be added to just a scene. In order to determine the correlations between objects captured in different data, probabilities models 2106 may also be invoked, which may correspond to artificial intelligent engines that may utilize input to make specific predications on whether objects can be correlated, such as using likelihood matches 2108. Likelihood matches 2108 may correspond to those weights and other deterministic models that may be trained utilizing data from one or more augmented reality experiences.

Figure 4:
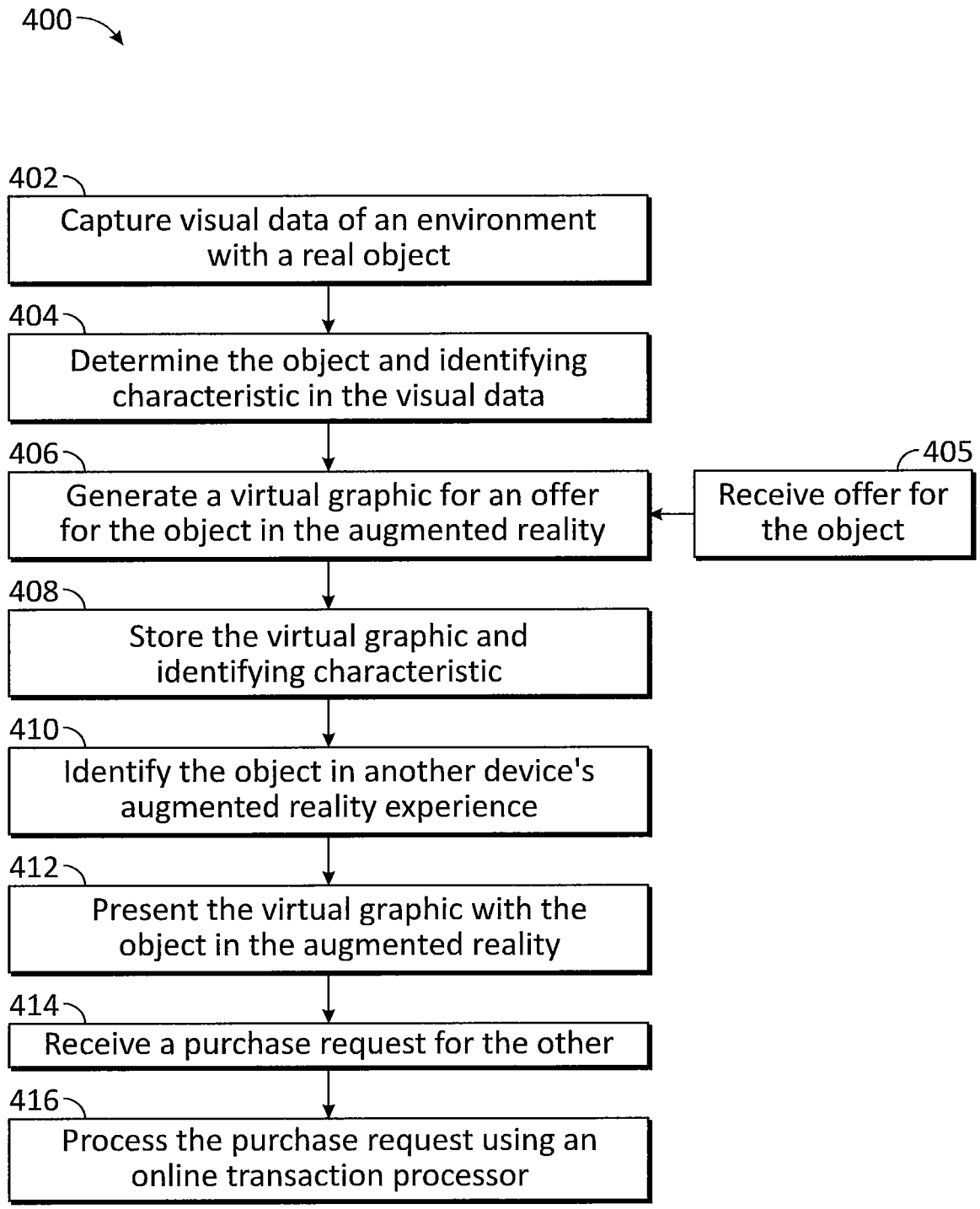
FIG. 4 is a flowchart of an exemplary process for tagging objects in augmented reality to track object data, according to an embodiment.

FIG. 4 is a flowchart of an exemplary process for tagging objects in augmented reality to track object data, according to an embodiment. Note that one or more steps, processes, and methods described herein may be omitted, performed in a different sequence, or combined as desired or appropriate.

At step 402 of flowchart 400, visual data of an environment with a real object is captured, where the visual data may correspond to images, video, and/or a scan of a real-world environment having the object. This may therefore be captured by a user's device, such as a mobile phone, wearable computing device, camera, or the like that includes an optical capture device. Additionally, an application, such as an augmented reality application, may be used to capture the environment, which then is further used to alter an output of the environment so that virtual graphics and visual indicators may be displayed with the visual data. At step 404, the object and an identifying characteristic of the object is determined in the visual data. The object may be identified using object recognitions processes, which may identify the object based on visual points, marks, or other information in the visual data. For example, a house, vehicle, personal item, or sale item may be identified in real-world data of the environment but identifying some features of the object. Further, the identifying characteristic, including a location, mark, feature, time of capture, or other information that allow for identification of the object by other devices similarly capturing visual data of the object may be determined using the visual data.

In some embodiments, this may include requesting the user to select or identify the identification information or characteristics of the object. However, the user's device and/or a service provider server may also determine the identifying characteristic. For example, an object fingerprint may be generated using the identifying characteristics of the object to create a set of data that assists in better identifying the object in visual data based on the different characteristics of the object and a machine learning model. This may include capturing feature data of the object, including those visual features that may be extracted from images of the object. Further, the identifying characteristics may include metadata of the visual data, including locations and timestamps of capture of the object in visual data. Together, this data may be used to create an object fingerprint, which is then stored and associated with the object. Using this information and fingerprint with an augmented reality process for an augmented reality experience, a virtual graphic for an offer for the object in the augmented reality experience is determined, at step 406. Prior to this, an additional step 405 may occur where an offer for the object is received from the user, for example, an amount for the object, an identifier for the user, or other information allowing for a purchase or sale of the object. However, the offer may also be determined based on other offers for the same or similar object, which may utilize a distributed ledger of offers from other devices that utilize the augmented reality experience. At step 408, the virtual graphic and the identifying characteristic are stored so that when the augmented reality experience is utilized, the virtual graphic may be retrieved and presented with the object through an application on a device. Thus, the object's fingerprint in then updated with the virtual graphic for the augmented reality experience. This allows the fingerprint of the object based on the identifying characteristics to be used to retrieve the virtual graphic for the augmented reality experience.

Thereafter, the object is identified in another device's augmented reality experience, at step 410. This may include utilizing the identifying characteristic and an object recognition process to determine the object is present in the augmented reality experience being viewed on another user's device. Additionally, the same user may also view the object, for example, to see other offers for the object, which may also require object recognition. A probabilistic model may be used to determine whether the object is present in the other visual data, for example, by determining which a high enough degree of certainty (e.g., over a threshold percentage or level) that the object is present in the current visual data. At step 412, the virtual graphic is presented with the object in the augmented reality experience. For example, the virtual graphic may be overlaid on, combined with, or used to adjust the visual data. The virtual graphic may allow for interaction, such as selection for display of the offer, or may generally display all data for the offer. The virtual graphic further may allow for the user capturing the object to contact the user making the offer, such as to negotiate a price, agree to the offer, and/or process a transaction (e.g., using an online transaction processor). A purchase request for the offer is then received at step 414. The purchase request may identify an account for both the users, which may allow the purchaser to buy the object from the seller. Thereafter, the purchase request is processed using an online transaction processor, at step 416. This may include providing a payment to the account of the seller from the account of the buyer.

Figure 5:
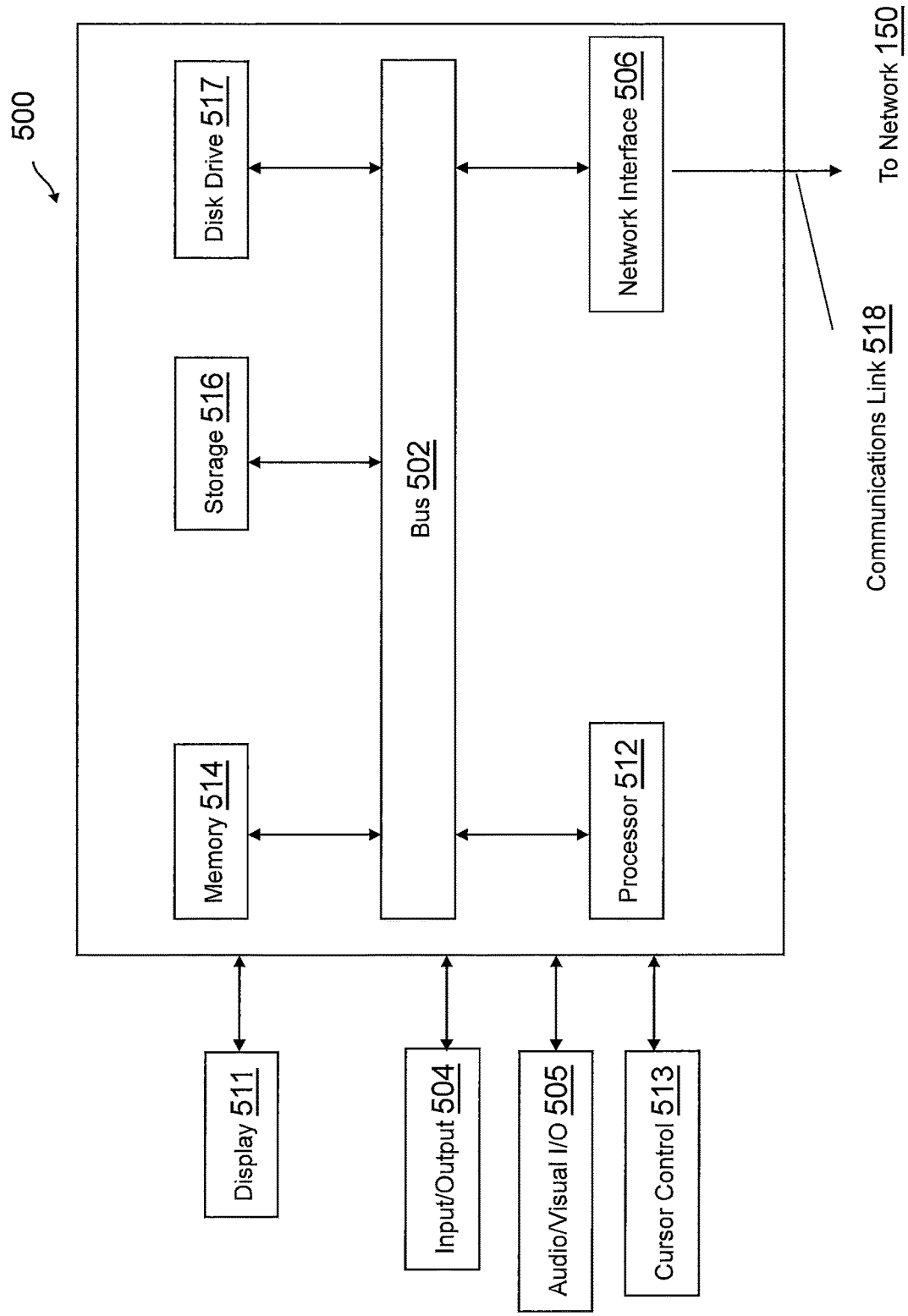
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A service provider system comprising:
a non-transitory memory; and
one or more hardware processors coupled to the non-transitory memory and configured to read instructions from the non-transitory memory to cause the service provider system to perform operations comprising:

receiving first image data for a first image of an object being viewed by a first user via an augmented reality application of a first device;

determining a first physical cue by the first user in the first image data, wherein the first physical cue comprises an indication of the first user selecting the object in the first image data for the augmented reality application;

determining an identifying characteristic associated with the object based on the first image data and the first physical cue;

associating an identifier with the object based on the identifying characteristic, wherein the identifier is accessible by other users of the augmented reality application;

detecting a first offer for a first purchase of the object from the first device;

receiving a second physical cue by the first user captured via the augmented reality application, wherein the second physical cue comprises a body movement by the first user with the object that indicates a change to the first offer based on the body movement modifying the first offer based on the second physical cue;

generating a first visual indicator corresponding to the modified first offer;

generating metadata associated with a timestamp and a location of capture of the first image of the object in the augmented reality application for the modified first offer based on the first image data and the first offer;

associating the first visual indicator with the object, wherein the first visual indicator is viewable by users of the augmented reality application that are within a threshold distance of the object; and adding the metadata to the object in the augmented reality application for the first visual indicator for the modified first offer, wherein the added metadata enables a tracking in the augmented reality application during a movement of the object using the timestamp and the location.

2. The service provider system of claim 1, wherein the operations further comprise:

receiving second image data for a second image from a second device of a second user;

determining that the second image comprises the object using a probabilistic model for object identification and the added metadata; and causing the first visual indicator to be displayed with the object in the second image data.

3. The service provider system of claim 2, wherein the probabilistic model is based on at least one of a predicted travel distance of the object over a time period based on the movement or a number of instances of the object within a proximity of the location associated with the object.

4. The service provider system of claim 1, wherein the determining the identifying characteristic comprises receiving the identifying characteristic from the first device based on a selection of a portion of the object within the first image.

5. The service provider system of claim 1, wherein the operations further comprise:

receiving second image data for a second image from a second device of a second user;

determining that the second image comprises the object based on the identifying characteristic in the second image and the added metadata; and causing the first visual indicator to be displayed with the object in the second image data.

6. The service provider system of claim 5, wherein prior to the causing, the operations further comprise:

authenticating that the second user is an owner of the object, wherein the causing is in response to the authenticating.

7. The service provider system of claim 6, wherein the operations further comprise:

receiving an acceptance of the modified first offer from the second user; and processing a sale of the object to the first user based on the acceptance and the authenticating.

8. The service provider system of claim 6, wherein the authenticating that the second user is the owner comprises:

analyzing an ownership document for the object; and verifying that the second user is the owner of the object based on the ownership document.

9. The service provider system of claim 5, wherein the operations further comprise:

receiving a second offer for the object from the second user; and adding the second offer to one of the first visual indicator or a second visual indicator for the object.

10. The service provider system of claim 1, wherein the associating the first visual indicator to the object comprises storing the modified first offer and the first visual indicator with the identifier in a record database.

11. The service provider system of claim 10, wherein the record database comprises a blockchain record of at least the modified first offer distributed to a plurality of other devices.

12. A method comprising:

capturing an image of an object in an augmented reality scene recorded by an application on a mobile device of a first user, wherein the image is associated with image metadata from the augmented reality scene recorded by the mobile device;

determining a first physical cue by the first user in the image, wherein the first physical cue comprises an indication of the first user selecting the object in the image of the augmented reality scene;

receiving, based on the first physical cue, a purchase offer of the object from the first user via the augmented reality scene recorded by the mobile device of the first user;

receiving a second physical cue by the first user captured in the augmented reality scene, wherein the second physical cue comprises a body movement by the first user with the object that indicates a change to the purchase offer based on the body movement modifying the purchase offer based on the second physical cue;

in response to the receiving, determining an identifying mark of the object based on the image;

determining a geo-location of the object based on the image metadata;

generating additional metadata associated with a timestamp of capture of the image of the object in the augmented reality scene for the modified purchase offer based on the image and the purchase offer;

creating a virtual graphic for the modified purchase offer within the augmented reality scene;

tagging the object within the augmented reality scene with the virtual graphic, wherein the object is tagged based on the identifying mark and the geo-location; and adding the additional metadata to the object in the augmented reality scene for the virtual graphic for the modified purchase offer, wherein the added additional metadata enables a tracking in the augmented reality scene during a movement of the object.

13. The method of claim 12, wherein the object comprises one of a plurality of objects, and wherein each of the plurality of objects is further tagged with the virtual graphic within the augmented reality scene.

14. The method of claim 13, further comprising:
receiving at least one additional image of a different one of the plurality of objects from a second user;
determining that the at least one additional image comprises the object based on the geo-location, the identifying mark, and the added additional metadata; and
displaying the virtual graphic with the different one of the plurality of objects in the augmented reality scene to the second user.

15. The method of claim 14, wherein the purchase offer further comprises a contact identifier for the first user, and wherein the virtual graphic is displayed with the contact identifier for the first user to the second user in the augmented reality scene.

16. The method of claim 14, wherein the determining that the at least one additional image comprises the object is further based on a number of the plurality of objects within an area associated with the geo-location.

17. A non-transitory machine-readable medium having stored thereon machine-readable instructions executable to cause a machine to perform operations comprising:
receiving visual data of an item for sale by a first user from a first device of the first user, wherein the visual data comprises a geo-location tag of the item identifying the item to an object recognition operation of an augmented reality experience;
determining a first physical cue by the first user in the visual data, wherein the first physical cue comprises an indication of the first user selecting the item in the visual data of the augmented reality experience;
determining, based on the first physical cue, a sale offer of the item from the first device, wherein the sale offer comprises a contact identifier of the first user;
receiving a second physical cue by the first user captured in the augmented reality experience by the visual data, wherein the second physical cue comprises a body movement by the first user with the item that indicates a change to the sale offer based on the body movement;
modifying the sale offer based on the second physical cue;
generating metadata associated with a timestamp of capture of the visual data of the item in the augmented reality experience for the modified sale offer based on the visual data and the sale offer;
generating a graphical object for the item in the augmented reality experience based on the modified sale offer and the contact identifier;
linking the graphical object to the item in the augmented reality experience;
adding the metadata to the item in the augmented reality experience for the graphical object for the modified sale offer, wherein the added metadata enables a tracking in the augmented reality experience during a movement of the item;
receiving an image within the augmented reality experience from a second device of a second user;
determining that the image includes the item based at least on the geo-location tag and the added metadata; and
displaying the graphical object within the augmented reality experience on the second device, wherein the graphical object is associated with the item in the augmented reality experience.

18. The non-transitory machine-readable medium of claim 17, wherein the geo-location tag comprises a device identifier for one of the first device or a third device associated with the item, wherein the device identifier allows GPS lookup of the first device or the third device for geo-location detection of the item.

19. The non-transitory machine-readable medium of claim 17, wherein the visual data comprises one of a plurality of images, a video, or a three-dimensional scan of the item, wherein the visual data further comprises a selection of an identifying mark on the item, and wherein the graphical object is further associated with the item based on the identifying mark.

20. The non-transitory machine-readable medium of claim 17, wherein the operations further comprise:
receiving a purchase offer of the item from the second device; and
notifying the first user of the purchase offer via the augmented reality experience.

* * * * *